(12) United States Patent
Hillan (10) Patent No.: US 9,326,222 B2
(45) Date of Patent: Apr. 26, 2016

(54) METHODS AND APPARATUS FOR IMPROVING A NFCEE DISCOVERY PROCESS

(71) Applicant: QUALCOMM Incorporated, San Diego, CA (US)

(72) Inventor: John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 13/623,363

(22) Filed: Sep. 20, 2012

(65) Prior Publication Data

US 2013/0078920 A1    Mar. 28, 2013

Related U.S. Application Data

(60) Provisional application No. 61/538,676, filed on Sep. 23, 2011.

(51) Int. Cl.
| | | |
|---|---|---|
| *H04W 48/16* | (2009.01) | |
| *H04W 4/00* | (2009.01) | |
| *H04W 8/00* | (2009.01) | |

(52) U.S. Cl.
CPC .............. *H04W 48/16* (2013.01); *H04W 4/008* (2013.01); *H04W 8/005* (2013.01); *H04W 4/00* (2013.01)

(58) Field of Classification Search
CPC ........ H04W 4/008; H04B 5/00; G06K 7/0008
See application file for complete search history.

(56) References Cited

U.S. PATENT DOCUMENTS

| | | | |
|---|---|---|---|
| 2009/0104875 A1 | 4/2009 | Naniyat | |
| 2009/0247078 A1* | 10/2009 | Sklovsky | ................ H04L 67/16 455/41.1 |
| 2010/0169686 A1 | 7/2010 | Ryoo et al. | |
| 2010/0227553 A1* | 9/2010 | Charrat | ................ G06Q 20/341 455/41.1 |
| 2011/0130095 A1 | 6/2011 | Naniyat et al. | |

(Continued)

FOREIGN PATENT DOCUMENTS

| | | |
|---|---|---|
| KR | 100838526 B1 | 6/2008 |
| KR | 20110000666 A | 1/2011 |

OTHER PUBLICATIONS

Elias, Ilan, Texas Instruments, [Patch v2 3/r Resend] NFC: basic NCI protocol implementation, Sep. 18, 2011, http://www.spinics.net/lists/linux-wireless/msg76923.html.*

(Continued)

*Primary Examiner* — Edward Urban
*Assistant Examiner* — Ralph H Justus
(74) *Attorney, Agent, or Firm* — Joseph Hanasz (57) ABSTRACT

Aspects disclosed herein relate to providing a mechanism by which an NFCC can provide a DH with sufficient information to begin RF Discovery on behalf of a NFCEE. In one example, with a NFC device a DH may be configured to receive a discovery request notification from a NFCC indicating a NFCEE is requesting that the DH perform a discovery process. The discovery request notification may include information formatted to simplify the creation of a RF discovery command. The DH may further be configured to determine whether to generate the RF discovery command using the information included in the discovery request notification, generate the DH based discover command using the information included in the discovery request notification upon a determination to include the received information, and transmit the RF discovery command to the NFCC.

36 Claims, 8 Drawing Sheets

(56) References Cited

U.S. PATENT DOCUMENTS

| | | | |
|---|---|---|---|
| 2011/0210820 A1 | 9/2011 | Talty et al. | |
| 2011/0226853 A1 | 9/2011 | Soh et al. | |
| 2012/0045989 A1* | 2/2012 | Suumaki | H04W 8/005 455/41.1 |
| 2013/0078920 A1* | 3/2013 | Hillan | H04W 48/16 455/41.1 |
| 2014/0035727 A1* | 2/2014 | Nguyen | H04W 4/008 340/10.1 |

OTHER PUBLICATIONS

Antoniou Z., et al., "Intuitive Mobile User Interaction in Smart Spaces via NFC-Enhanced Devices", Wireless and Mobile Communications, 2007. ICWMC '07, Third Internati0nal Conference on, IEEE, PI, Mar. 1, 2007, XP031066006, ISBN: 978-0-7695-2796-3, abstract chapter I, chapter II, chapter IV, chapter V.
International Search Report and Written Opinion—PCT/US2012/056706—ISA/EPO—Jul. 23, 2013.
Sony: "Best pratices White Paper—NFC-F Device Detection", Version 1.0, No. M700-E01-00, Jan. 1, 2011, XP055020039, pp. 1-24.
Yoon H., et al., "Design and implementation of a universal appliance controller based on selective interaction modes", IEEE Transactions on Consumer Electronics, IEEE Service Center, New York, NY, US, vol. 54, No. 4, Nov. 1, 2008, pp. 1722-1729, XP011239738, ISSN: 0098-3063, DOI: 10.1109/TCE.2008.4711226, A chapter I, chapter III, chapter IV.B.
[RFC] NFC: NCI protocol proposal, http://comments.gmane.org/gmane.linux.kernel.wireless.general/74753, Aug. 9, 2011.

* cited by examiner

METHODS AND APPARATUS FOR IMPROVING A NFCEE DISCOVERY PROCESS

CLAIM OF PRIORITY UNDER 35 U.S.C. §119

The present Application for Patent claims priority to Provisional Application No. 61/538,676 entitled "METHODS AND APPARATUS FOR IMPROVING NFCEE DISCOVERY PROCESS" filed Sep. 23, 2011, and assigned to the assignee hereof and hereby expressly incorporated by reference herein.

REFERENCE TO CO-PENDING APPLICATIONS FOR PATENT

The present Application for Patent is related to the following co-pending U.S. Provisional Patent Application 61/534,111: "METHODS AND APPARATUS FOR PROVIDING NFCEE CONTEXT TO NFC DISCOVERY PROCESS," filed on Sep. 13, 2011, assigned to the assignee hereof, and expressly incorporated by reference herein.

BACKGROUND

1. Field

The disclosed aspects relate generally to communications between and/or within devices and specifically to methods and systems for improving a radio frequency (RF) discovery process, facilitated by a NFC controller (NFCC) and a device host (DH), for requests that originate from a Near Field Communication (NFC) execution environment (NFCEE).

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

As described in the present draft of the NFC Forum Controller Interface (NCI) specification, a DH orchestrates communications with the NFCC to start a RF discovery process. As part of this process, a RF discover command (e.g., RF_DISCOVER_CMD) is used that includes parameters covering a list of discovery tasks for the NFCC to perform. Another message associated with the RF discovery process is a NFCEE discovery request notification (e.g., RF_NFCEE_DISCOVERY_REQ_NTF). The RF_NFCEE_DISCOVERY_REQ_NTF enables the NFCC to inform the DH that an NFCEE (e.g., secure element) is coupled to the NFCC and that the NFCEE intends to prompt the NFCC to perform RF Discovery on its behalf. For example, applications resident on a NFCEE (e.g., universal integrated communication card (UICC)) or other secure element may be enabled to attempt NFC transactions independently of the DH. To date, there is no interplay/overlap between the parameters included in the RF_DISCOVER_CMD and the parameters in the RF_NFCEE_DISCOVERY_REQ_NTF. As such, although the DH may be notified that an NFCEE intends to use the NFCC for RF discovery, the DH is not made aware of any configuration parameters the NFCEE would prefer/request to be used during such an RF discovery. For example, the DH is unaware of the NFCEE preferences with respect to RF technology (NFC-A, B, F), RF mode (e.g., polling, listening) and whether active or passive communications are to be used during RF discovery. Thus, improved apparatuses and methods for providing a mechanism by which an NFCC can provide a DH with sufficient information to begin RF Discovery on behalf of a NFCEE may be desired.

SUMMARY

The following presents a summary of one or more aspects in order to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects as a prelude to the more detailed description presented later.

Various aspects are described in connection with providing a mechanism by which an NFCC can provide a DH with sufficient information to begin RF Discovery on behalf of a NFCEE. In one example, with a NFC device a DH may be configured to receive a discovery request notification from a NFCC indicating that a NFCEE is requesting that the DH perform a discovery process. The discovery request notification may include information formatted to simplify the creation of a RF discovery command. The DH may further be configured to determine whether to generate the RF discovery command using the information included in the discovery request notification, generate the DH-based discover command using the information included in the discovery request notification upon a determination to include the received information, and transmit the RF discovery command to the NFCC.

According to related aspects, a method for providing a mechanism by which an NFCC can provide a DH with sufficient information to begin RF Discovery on behalf of a NFCEE. The method can include receiving a discovery request notification from a NFCC indicating that a NFCEE is requesting that the DH perform a discovery process. The method may include determining whether to generate the RF discovery command using the information included in the discovery request notification. The method may further include generating the DH-based discover command using the information included in the discovery request notification upon a determination to include the received information. Moreover, the method can include transmitting the RF discovery command to the NFCC.

Another aspect relates to a communications apparatus. The wireless communications apparatus can include means for receiving a discovery request notification from a NFCC indicating that a NFCEE is requesting that the DH perform a discovery process. The communications apparatus can include means for determining whether to generate the RF discovery command using the information included in the discovery request notification. The communications apparatus can further include means for generating the DH-based discover command using the information included in the discovery request notification upon a determination to include the received information. Moreover, the communications apparatus can include means for transmitting the RF discovery command to the NFCC.

Another aspect relates to a communications apparatus. The apparatus can include a DH configured to receive a discovery request notification from a NFCC indicating that a NFCEE is requesting that the DH perform a discovery process. The DH may be configured to determine whether to generate the RF discovery command using the information included in the discovery request notification. The DH may be further configured to generate the DH-based discover command using the information included in the discovery request notification upon a determination to include the received information. The DH may also be configured to transmit the RF discovery command to the NFCC.

Another aspect relates to a computer program product, which can have a computer-readable medium comprising code for receiving a discovery request notification from a NFCC indicating that a NFCEE is requesting that the DH perform a discovery process. The computer-readable medium can include code for determining whether to generate the RF discovery command using the information included in the discovery request notification. The computer-readable medium can further include code for generating the DH-based discover command using the information included in the discovery request notification upon a determination to include the received information. The computer-readable medium can also include code for transmitting the RF discovery command to the NFCC.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It should be understood, however, that such aspect(s) may be practiced without these specific details.

Generally, a device may recognize a NFC target device and/or tag when within range of the coverage area of the NFC device and/or tag. Thereafter, the device may obtain sufficient information to allow for communications to be established. One form of communications that may be established is a peer-to-peer communications link (e.g., a NFC-DEP based communications link). As described herein, communications between the devices may be enabled over a variety of NFC RF technologies, such as but not limited to, NFC-A, NFC-B, NFC-F, etc. Further, different NFC technologies may be enabled during different phases of communications (e.g., an activation phase, a data exchange phase, etc.) Still further, different bit rates may be used at different phases of communications.

Figure 1:
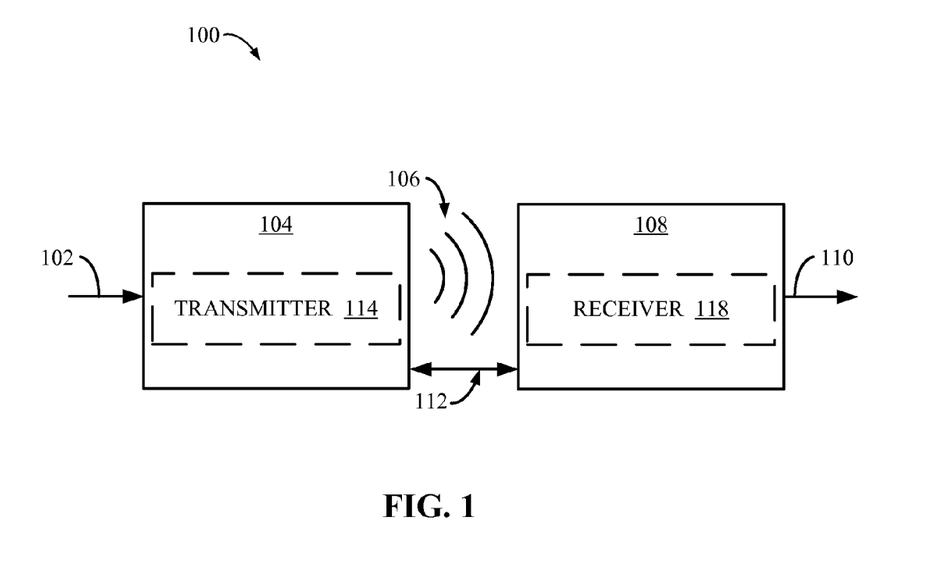
FIG. 1 is a block diagram of a near field wireless communication system according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 as a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
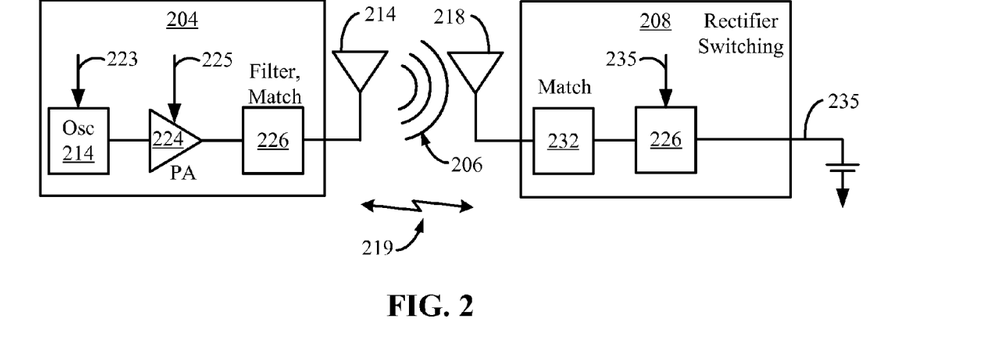
FIG. 2 is a schematic diagram of a near field communication transfer system according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

Figure 3:
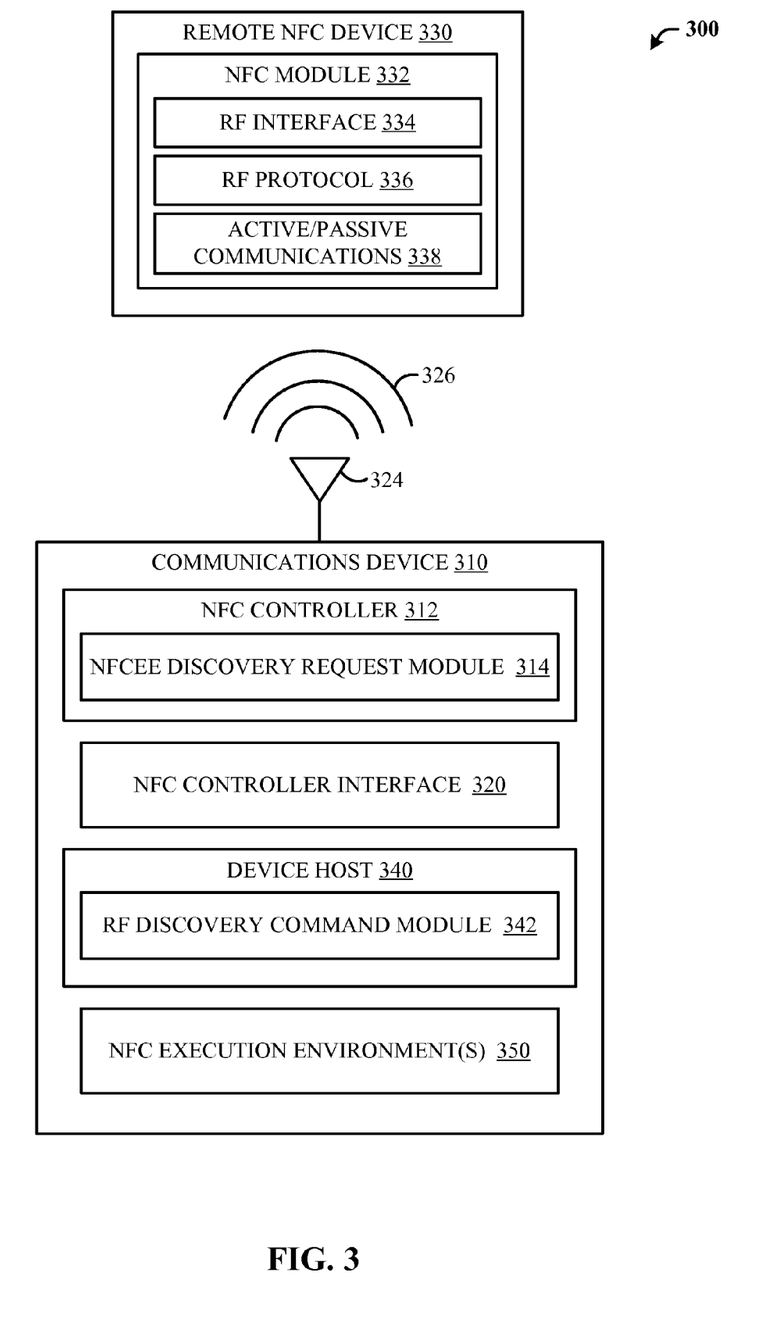
FIG. 3 is a block diagram of a NFC environment according to an aspect.

With reference to FIG. 3, a block diagram of a communication network 300 according to an aspect is illustrated. Communication network 300 may include communications devices 310 which, through antenna 324, may be in communication with a remote NFC device 330 using one or more NFC technologies 326 (e.g., NFC-A, NFC-B, NFC-F, etc.). In an aspect, remote NFC device 330 and/or communications device 310 may be operable to communicate through NFC module 332 through one or more RF interfaces 334 using one or more RF protocols 336, in either an active or passive communication mode 338. In another aspect, communications device 310 may be operable to be connected to an access network and/or core network (e.g., a CDMA network, a GPRS network, a UMTS network, and other types of wireline and wireless communication networks). In an aspect, remote NFC device may include but is not limited to a remote NFC tag, a reader/writer device, a peer initiator device, a remote peer target device, etc.

Communications device 310 may include NCI 320. In an aspect, NCI 320 may be operable to enable communications between a NFC enabled antenna and NFC controller 312. NCI 320 may be operable to function in a listening mode and/or a polling mode.

In another aspect, communications device 310 may include one or more NFCEEs 350. In an aspect, NFCEE 350 may be coupled to NFC controller 312. Further, NFCEE 350 may include one or more applications that are operable to request access to various functionalities availability through NFC controller 312. In an aspect, NFCEE 350 may be a secure element. In an aspect, NFCEE 350 may include a UICC with various modules such as but not limited to, a subscriber information module (SIM), a CDMA Subscriber Identity Module (CSIM), etc. In another aspect, each NFCEE 350 may distinguished by the NFC controller 312 using a NFCEE identifier for use during the RF discovery process.

Communications device 310 may include a NFC controller 312. In an aspect, NFCC 312 may include NFCEE discovery request module 314. NFCEE discovery request module 314 may be operable to receive requests from one or more NFCEEs 350. In an aspect, such requests may include a NFCEE identifier and a request for access to functionality associated with NFC controller 312, such as the RF discovery process. As DH 340 controls the RF discovery process, NFCEE discovery request module 314 may be further operable to generate a NFCEE discovery request notification (e.g., RF_NFCEE_DISCOVERY_REQ_NTF) message including one or more parameters that identify the NFCEE and/or one or more parameters indicate configuration setting the NFCEE would prefer to use during the RF discovery process. Table 1 describes various fields that may be included in an RF_NFCEE_DISCOVERY_REQ_NTF message according to an aspect.

TABLE 1

Notification for NFCEE Discovery Request
RF_NFCEE_DISCOVERY_REQ_NTF

| Payload Field(s) | Length | Value/Description |
| --- | --- | --- |
| NFCEE ID | 1 Octet | The ID of the NFCEE requesting RF Discovery (see Section 5.2) |
| RF Technology and Mode | 1 Octet | The RF Technology and Mode being requested (see Table 53). |

The table reference within Table 1 (e.g., Section 5.2, Table 53) is made in the context of the current NCI draft Standard. Generally, the DH 340 may take the NFCEE's 350 request under consideration, based on its own requirements and requests for other NFCEEs 350. Although the DH may take the NFCEE's 350 request under consideration, the action taken by the DH 340 on receipt of this notification is implementation specific. Further, if DH 340 decides to start RF Discovery on behalf of the NFCEE 350, DH 340 may include the RF technology and Mode value from the Notification provided in Table 1 in the Configuration list field of an RF discovery command (e.g., RF_DISCOVER_CMD).

DH 340 may include RF discovery command module 342 that is operable to generate a command to prompt NFCC 312 to perform various functions associated with RF discovery. Table 2 describes various fields that may be included in an RF_DISCOVER_CMD.

TABLE 2

RF Discovery Command Parameters
RF_DISCOVER_CMD

| Payload Field(s) | Length | Value/Description | | |
| --- | --- | --- | --- | --- |
| NFCEE ID | 1 Octet | Either DH-NFCEE ID or the ID of the NFCEE requesting RF Discovery (see Table 80) | | |
| Number of Configurations | 1 Octet | The number of Configuration fields to follow (n). | | |
| Configuration [1 . . . n] | 2 Octets | Discovery Type | 1 Octet | See Table 52. |
| | | Discovery Frequency | 1 Octet | 0x00 RFU |
| | | | | 0x01 Discovery Type will be executed in every discovery period. |
| | | | | 0x02-0x0A These values are allowed for Poll Mode Discovery Types. This value specifies how often the Poll period of the specific RF Technology will be executed. For example, a value of 10 indicates that this Polling will be executed in every $10^{th}$ discovery period. |
| | | | | 0x0B-0xFF RFU |

Referring to Table 2, the parameters "Discovery Type" and "Discovery Frequency" are provided by the DH 340 to configure the manner in which the NFCC 312 performs the RF Discovery Process. Further, the RF discovery command may include a field for a NFCEE identifier value. The NFCEE identifier is included in the table for illustrative purposes and may or may not be used in association with the disclosed aspects herein. Table references within Table 2 (e.g., Table 80, table 52) are made in the context of the current NCI draft Standard. As noted above, Tables 52 and Table 53 include the same content, and as such, the Discovery Type value recited in Table 2 may be interchangeable with a RF Technology and Mode value, as recited in Table 1. In an aspect, the NFCEE identifier may be set to a default value when the RF_DISCOVER_CMD message is being sent because DH 340 intends to start RF discovery for its own reasons. In another aspect, the NFCEE identifier may be set to the value of the NFCEE provided by NFCC 350 in the RF_NFCEE_DISCOVERY_REQ_NTF.

In operation, the DH 340 requests that the NFCC 312 starts Discovery activity by sending the RF_DISCOVER_CMD. The NFCEE ID and RF Technology and Mode values in the RF_DISCOVER_CMD may used to inform the NFCC 312 whether the command is sent as a consequence of a previous RF_NFCEE_DISCOVERY_REQ_NTF from NFCC 312 and NFCEE 350, and what configuration settings the NFCEE 350 is requesting. If the message is sent because decisions made within the DH 340, the value of the NFCEE-ID parameter is set to a default value (e.g., DH-NFCEE), and the RF technology and mode value may be set as determined by the DH. Otherwise, if the message is sent because DH 340 is reacting to a request to begin RF Discovery on behalf of an NFCEE 350, then the value of the NFCEE-ID parameter may be set to the NFCEE ID value sent in the relevant RF_NFCEE_DISCOVERY_REQ_NTF and the RF technology and mode value may be set to the RF Technology and Mode value sent in the relevant RF_NFCEE_DISCOVERY_REQ_NTF. As such, formatting used in creating and populating the RF_NFCEE_DISCOVERY_REQ_NTF may be the same as the formatting used in creating and populating the RF_DISCOVER_CMD.

If the parameters are acceptable for the NFCC 312, NFCC 312 returns the RF_DISCOVER_RSP with a Status of STATUS_OK and will start the RF Discovery Process accordingly. By contrast, if the NFCEE-ID field value is not recognized by the NFCC, a RF_DISCOVER_RSP will include an error code. As such, an example chain of messages including relevant parameters may include: RF_NFCEE_DISCOVERY_REQ_NTF (NFCEE_ID=n, DiscoveryType=D) message from NFCC 312 to DH 340; RF_DISCOVER_CMD (NFCEE_ID=n, nDiscoveryTypes=1, DiscoveryType=D) from DH 340 to NFCC 312; and RF_DISCOVER_RSP (STATUS_OK) from NFCC 312 to DH 340. In another aspect, an example chain of messages including relevant parameters may include: RF_NFCEE_DISCOVERY_REQ_NTF (NFCEE_ID=n, RFTechAndMode=R) from NFCC 312 to DH 340; RF_DISCOVER_CMD (NFCEE_ID=n, nRFTechAndModes=1, RFTechAndMode=R) from DH 340 to NFCC 312; RF_DISCOVER_RSP (STATUS_OK) from NFCC 312 to DH 340.

Accordingly, communications device 310 and device 340 utilize an efficient, optimized, and simplified procedure for providing improved NFCEE RF discovery.

Figure 4:
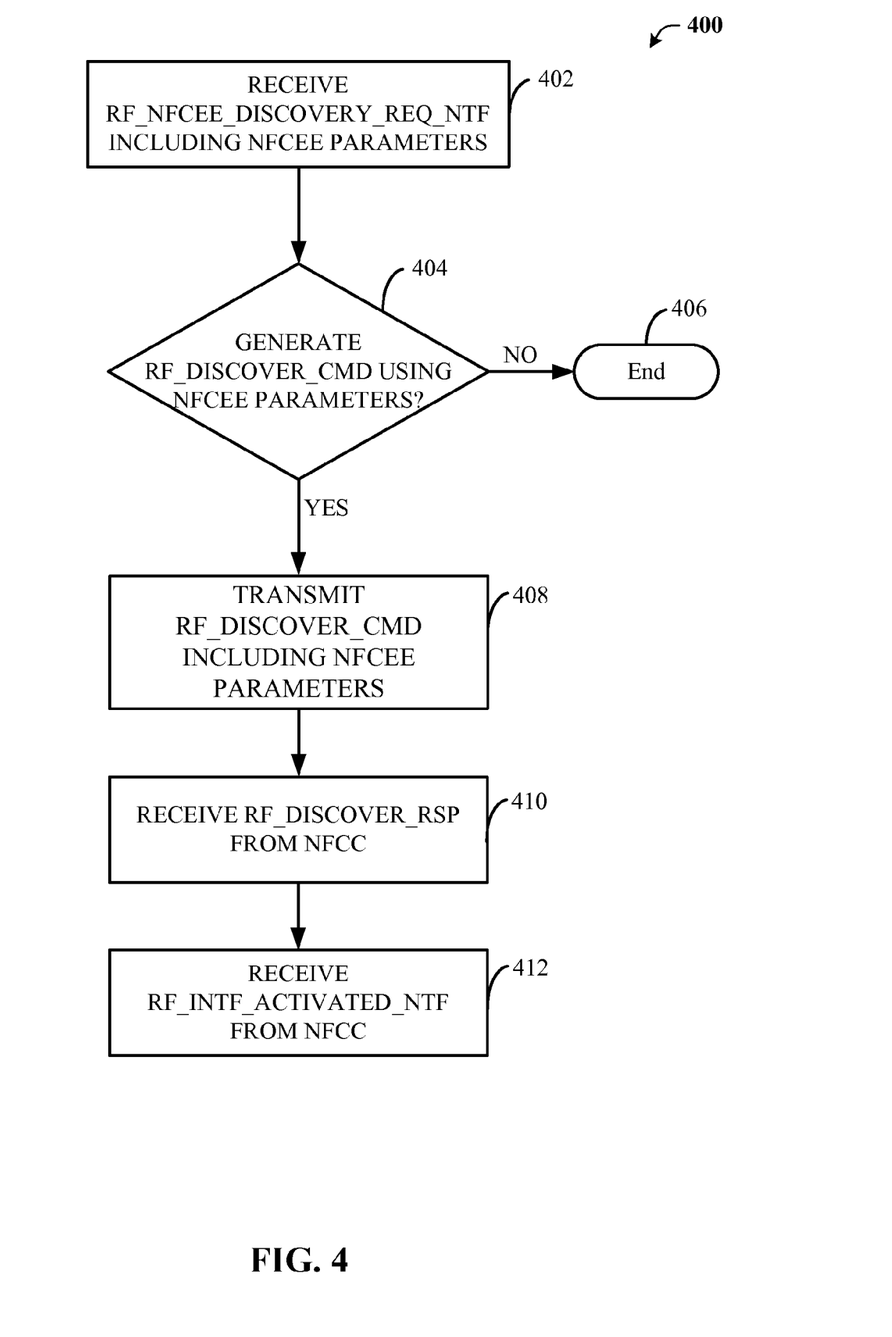
FIG. 4 is a flowchart describing an example of improving a NFCC discovery process originating from a NFCEE according to an aspect.
Figure 5:
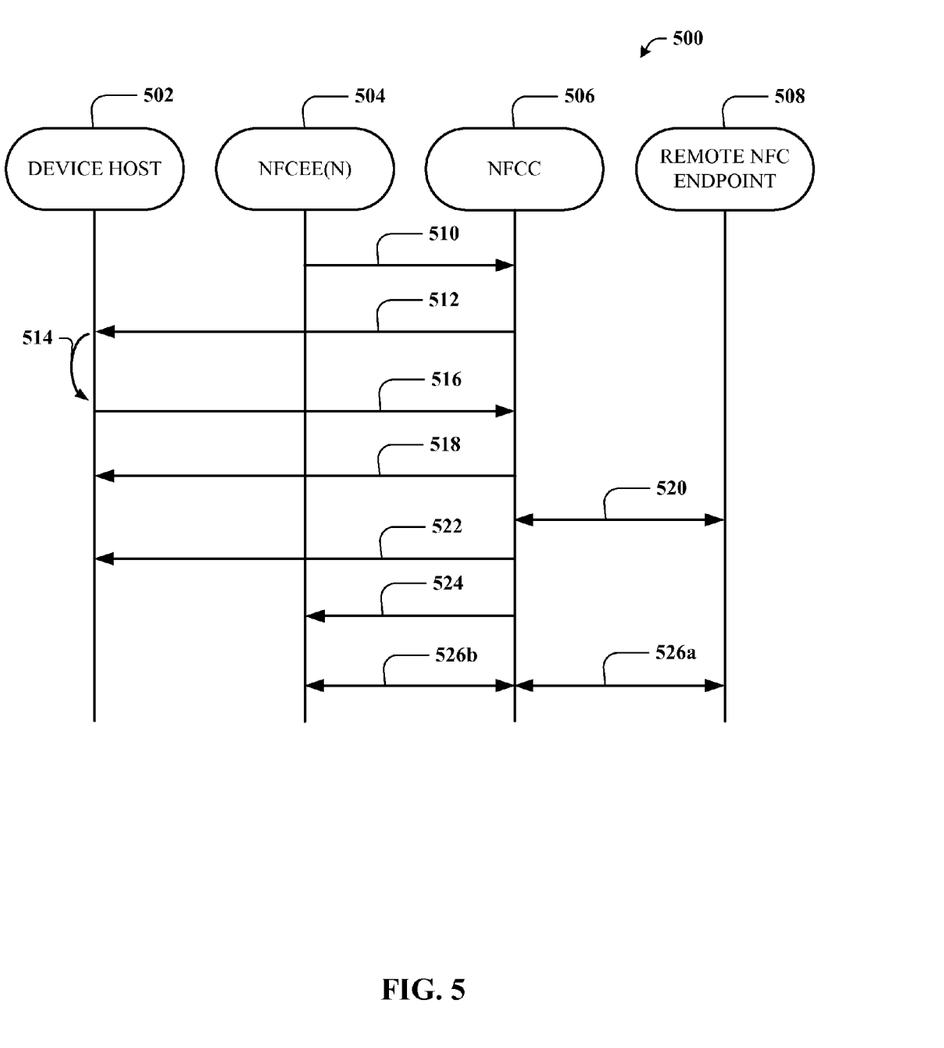
FIG. 5 is a call flow diagram describing an example of improving a NFCC discovery process originating from an NFCEE, according to an aspect.
Figure 6:
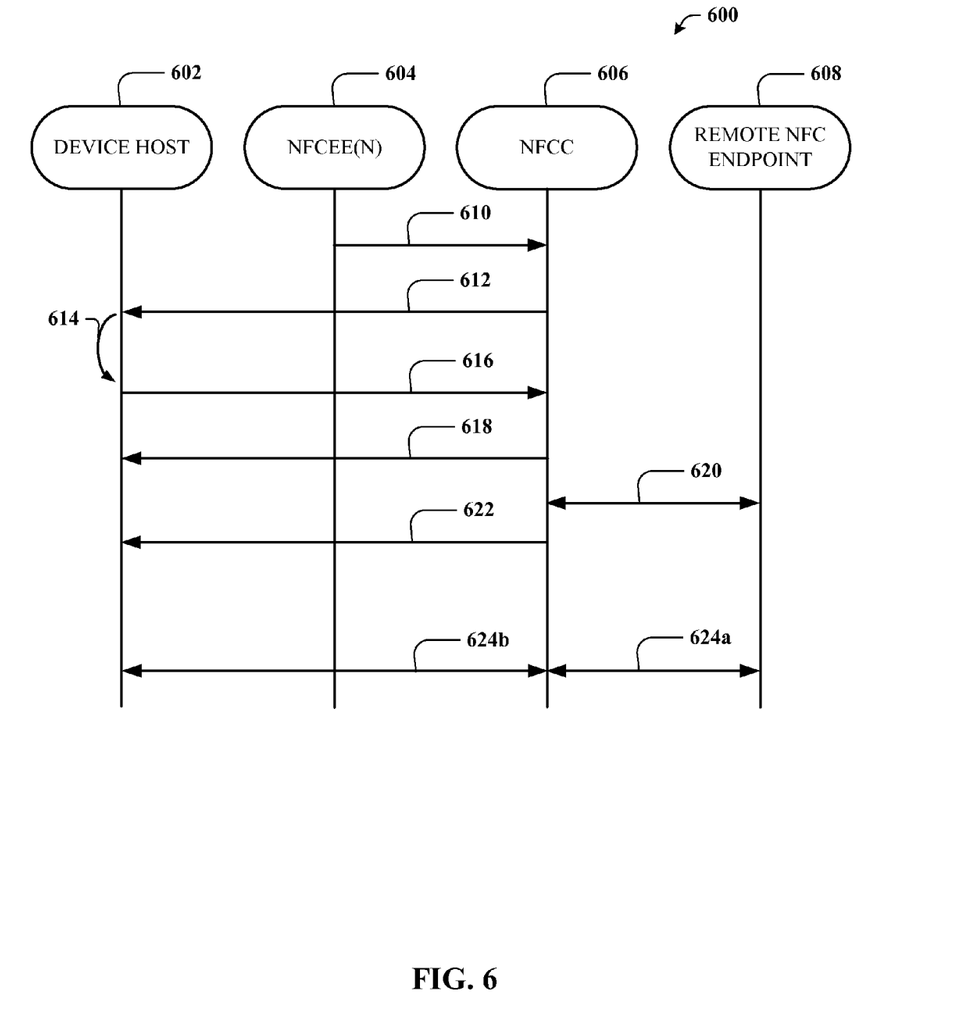
FIG. 6 is a call flow diagram describing another example of improving a NFCC discovery process originating from a NFCEE, according to an aspect.

FIGS. 4-6 illustrate methodologies in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 4, a flowchart describes an example process 400 for improving NFCEE RF discovery is. At block 402, DH may receive a NFCEE discovery request notification from a NFCC. In an aspect, the NFCEE discovery request notification may be a RF_NFCEE_DISCOVERY_REQ_NTF message. In such an aspect, the request may be sent by the NFCC in response to receiving a request for RF discovery services from an NFCEE. In an aspect, the notification may include a NFCEE identifier (e.g., NFCEE-ID) and a configuration parameter (e.g., RF Technology and Mode).

At block 404, the DH may determine whether to generate a RF discovery command in response to receipt of the NFCEE discovery request. If at block 404, the DH decides to generate a RF discovery command in response to the NFCEE discovery request, then at block 408, the DH transmits the generated RF discovery command including an NFCEE identifier and the configuration parameter indicating that the process originated from the requesting NFCEE, and the configure preferences of the NFCEE. In an aspect, the configuration parameter may indicate a RF technology (NFC-A, B, F), RF mode (e.g., polling, listening) and whether active or passive communications may be used during RF discovery. By contrast, if at block 404 the DH decides not to generate a RF discovery command in response to the NFCEE discovery request, the at block 406, in an optional aspect, the DH may transmit a RF discovery command including a default value in the NFCEE identifier field. Additionally, or in the alternative at block 406, the process may end if the DH decides not to generate a RF discovery command in response to the NFCEE discovery request. In an aspect, the default value (e.g., DH-NFCEE ID) may be zero. At block 410, the DH may receive a response from the NFCC (e.g., RF_DISCOVER_RSP) confirm receipt of the RF discovery command. Further, at block 412, the DH may receive a notification indicating that an interface has been activated (e.g., RF_INTF_ACTIVATED_NTF) with a remote NFC endpoint. In an aspect, there may be additional commands/responses send between the time of a RF_DISCOVER_CMD and the time of a RF_INTF_ACTIVATED_NTF. In an aspect in which the discovery command included an NFCEE ID, the notification may be provided to indicate that the NFCEE is actively using the NFCC. In an aspect in which the discovery command included the default NFCEE ID, the notification may inform the DH that data communications with the detected remote NFC endpoint is possible.

FIGS. 5 and 6 are call flow diagrams associated with RF discovery in response to an NFCEE request for use of NFCC RF discovery functionality. With reference now to FIG. 5, a NFC environment 500 including a device host 502, one or more NFCEEs 504, a NFCC 506 and a remote NFC endpoint 508 is illustrated.

At act 510, one of the one or more NFCEEs 504 (e.g., NFCEE(N)) request RF discovery access to NFCC 506. At act 512, NFCC 506 may generate a RF NFCEE discovery request notification (e.g., RF_NFCEE_DISCOVERY_

REQ_NTF) and communicate the request to device host 502. In an aspect, the request includes a NFCEE identifier (e.g., NFCEE ID=N) and a configuration parameter (e.g., RF Technology and Mode). At act 514, device host 502 decides to accept the request that originated from NFCEE 504 and generates a RF discovery command (e.g., RF_DISCOVER_CMD) with the NFCEE ID field set to indicate the requesting NFCEE 504 (e.g., NFCEE ID=N) and the RF technology and mode field set to the configuration parameter (e.g., RF Technology and Mode).

Generally, if the configuration parameter was not formatted and selected the RF technology and mode field in the RF discovery command, then the device host 502 would be required to perform at least one addition step of translating one or more configuration parameters in the RF NFCEE discovery request notification, to match the formatting used in the RF discovery command. For example, if only RF technology was added to the RF NFCEE discovery request notification does not provide sufficient information to the device host 502 with respect to any application RF mode and/or communication type (e.g., active or passive). Further, even if the device host 502 could infer an RF mode from the RF technology, the device host would still not be unaware of any communication type (e.g., active or passive). For example, for NFC-A or NFC-F technologies (in both polling and listening modes), the device host 502 needs to know whether this will be passive or active in order to select the correct RF technology and mode value to generate the RF discovery command. As such, inclusion of a configuration parameter in the RF NFCEE discovery request notification that is formatted to mirror the values used in the RF discovery command, allows for simpler processing and generates a RF discovery command that includes the RF technology and mode preferred by the NFCEE 504.

At act 516, device host 502 transmits the RF discovery command to NFCC 506. At act 518, NFCC 506 acknowledges receipt of the command with a response message (RF_DISCOVER_RSP). At act 520, NFCC 506 detects the presence of a remote NFC endpoint 508. In an aspect, the NFCC 506 is configured to use a specified RF technology, mode, and communication type based on the configuration parameter. In response to detection of remote NFC endpoint 508, at act 522 NFCC 506 transmits a notification message (e.g., RF_INTF_ACTIVATED_NTF) to device host 502. In an aspect, the notification further indicates that subsequent communications may be performed between NFCC 506 and NFCEE 504 (e.g., NFCEE Direct). At act 524 notifies NFCEE 504 of the remote NFC endpoint 508 presence and at acts 526a and 526b data may be communicated between NFCEE 504 and remote NFC endpoint 508 through NFCC 506. In an aspect, where the presence of multiple remote NFC endpoints 508 are detected, the NFCC 506 may communicate (not shown) the detection of the multiple remote NFC endpoints 508 to DH 502 and DH 502 may select a remote NFC endpoint 508 of the multiple remote NFC endpoints 508 with which to communicate.

With reference now to FIG. 6, a NFC environment 600 including a device host 602, one or more NFCEEs 604, a NFCC 606 and a remote NFC endpoint 608 is illustrated.

At act 610, one of the one or more NFCEEs 604 (e.g., NFCEE(N)) request RF discovery access to NFCC 606. At act 612, NFCC 606 may generate a RF NFCEE discovery request notification (e.g., RF_NFCEE_DISCOVERY_REQ_NTF) and communicate the request to device host 602. In an aspect, the request includes a NFCEE identifier (e.g., NFCEE ID=N) and a configuration parameter (e.g., RF Technology and Mode). At act 614, device host 602 decides not to accept the request that originated from NFCEE 604 and instead may generate a RF discovery command (e.g., RF_DISCOVER_CMD) with the NFCEE ID field set to a default value (e.g., DH-NFCEE ID) indicating the DH 602 (e.g., NFCEE ID=0). At act 616, device host 602 transmits the RF discovery command to NFCC 506. At act 618, NFCC 606 acknowledges receipt of the command with a response message (RF_DISCOVER_RSP). At act 620, NFCC 606 detects the presence of a remote NFC endpoint 608. In response to detection of remote NFC endpoint 608, at act 622 NFCC 606 transmits a notification message (e.g., RF_INTF_ACTIVATED_NTF) to device host 602. Since device host 602 decided not to include any indication that a request originated from NFCEE 604, no further notification is provided by NFCC 606 to NFCEE 604 to indicate the presence of remote NFC endpoint 608. At act 624a and 624b data may be communicated between device host 502 and remote NFC endpoint 608 through NFCC 606. In an aspect, where the presence of multiple remote NFC endpoints 608 are detected, the NFCC 606 may communicate (not shown) the detection of the multiple remote NFC endpoints 608 to DH 602 and DH 602 may select a remote NFC endpoint 608 of the multiple remote NFC endpoints 608 with which to communicate.

Figure 7:
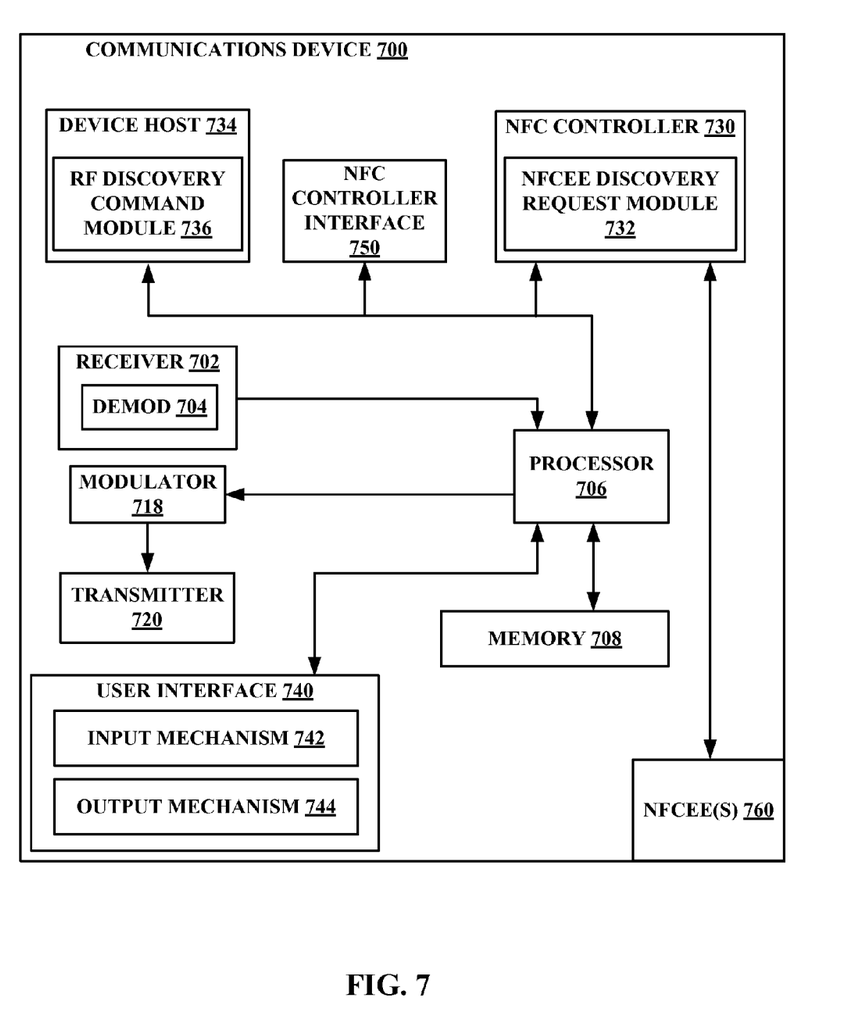
FIG. 7 is a functional block diagram of an example architecture of a device host (DH), according to an aspect.

While referencing FIG. 3, but turning also now to FIG. 7, an example architecture of communications device 700 is illustrated. As depicted in FIG. 7, communications device 700 comprises receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can include a demodulator 704 that can demodulate received symbols and provide them to processor 706 for channel estimation. Processor 706 can be a processor dedicated to analyzing information received by receiver 702 and/or generating information for transmission by transmitter 720, a processor that controls one or more components of communications device 700, and/or a processor that both analyzes information received by receiver 702, generates information for transmission by transmitter 720, and controls one or more components of communications device 700. Further, signals may be prepared for transmission by transmitter 720 through modulator 718 which may modulate the signals processed by processor 706.

Communications device 700 can additionally comprise memory 708 that is operatively coupled to processor 706 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, processor 706 and/or device host 734 can provide means for receiving a discovery request notification from a NFCC indicating a NFCEE is requesting that the DH perform a discovery process, wherein the discovery request notification includes information formatted to simplify the creation of a RF discovery command, means for determining whether to generate the RF discovery command using the information included in the discovery request notification, means for generating the DH based discover command using the information included in the discovery request notification upon a determination to include the received information, and means for transmitting the RF discovery command to the NFCC.

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

In another aspect, communications device 700 may include NCI 750. In an aspect, NCI 750 may be operable to enable communications between a NFC enabled antenna (e.g., 702, 720) and NFC controller 730. NCI 750 may be operable to function in a listening mode and/or a polling mode.

In another aspect, communications device 700 may include one or more NFCEEs 760. In an aspect, NFCEE 760 may be coupled to NFC controller 730. Further, NFCEE 760 may include one or more applications that are operable to request access to various functionalities availability through NFC controller 730. In an aspect, NFCEE 760 may in a secure element. In an aspect, NFCEE 760 may include a UICC with various modules such as but not limited to, a subscriber information module (SIM), a CDMA Subscriber Identity Module (CSIM), etc. In another aspect, NFCEE 760 may be assigned an index as a NFCEE identifier and may be operable to use settings indicated through a configuration parameter that may be used during the RF discovery process described with respect to FIGS. 4-6.

Communications device 700 may include a NFC controller 730. In an aspect, NFCC 730 may include NFCEE discovery request module 732. NFCEE discovery request module 732 may be operable to receive requests from one or more NFCEEs 760. In an aspect, such requests may include a NFCEE identifier and a configuration parameter as part of a request for access to functionality associated with NFC controller 730, such as the RF discovery process. As DH 734 controls the RF discovery process, NFCEE discovery request module 732 may be further operable to generate a NFCEE discover notification (e.g., RF_NFCEE_DISCOVERY_REQ_NTF) message including a NFCEE identifier and configuration parameter and may communicate this message to DH 734.

DH 734 may include RF discovery command module 736 that is operable to generate a command to prompt NFCC 730 to perform various functions associated with RF discovery. As noted above, Table 2 describes various fields that may be included in an RF discovery command (e.g., RF_DISCOVER_CMD). For example, the "RF Technology and Mode" parameter may be provided by the DH 734 to configure the manner in which the NFCC 730 performs the RF Discovery Process. Further, the RF discovery command may include a field for a NFCEE identifier value. In an aspect, the NFCEE identifier and RF technology and mode may be set to a default value when the RF_DISCOVER_CMD message is being sent by DH 734. In another aspect, the NFCEE identifier and RF technology and mode may be set to the value provided by the NFCEE through NFCC 730 in the RF_NFCEE_DISCOVERY_REQ_NTF.

In operation, the DH 734 requests that the NFCC 730 starts Discovery activity by sending the RF_DISCOVER_CMD. The NFCEE ID and RF technology and mode parameters in the RF_DISCOVER_CMD may be used to inform the NFCC 730 whether the command is sent as a consequence of a previous RF_NFCEE_DISCOVERY_REQ_NTF from NFCC 730 and NFCEE 760 and the RF discovery settings preferred by the NFCEE 760. If the message is sent because of decisions made within the DH 734, the value of the parameters may be set to default values (e.g., DH-NFCEE). Otherwise, if the message is sent because DH 734 is reacting to a request to begin RF Discovery on behalf of an NFCEE 760, then the value of the NFCEE ID field is selected as the value sent in the relevant RF_NFCEE_DISCOVERY_REQ_NTF and the RF technology and mode field is set to the configuration parameter sent in the relevant RF_NFCEE_DISCOVERY_REQ_NTF. If the parameters are acceptable for the NFCC 730, NFCC 730 returns the RF_DISCOVER_RSP with a Status of STATUS_OK and will start the RF Discovery Process accordingly.

Additionally, communications device 700 may include user interface 740. User interface 740 may include input mechanisms 742 for generating inputs into communications device 700, and output mechanism 744 for generating information for consumption by the user of the communications device 700. For example, input mechanism 742 may include a mechanism such as a key or keyboard, a mouse, a touch-screen display, a microphone, etc. Further, for example, output mechanism 744 may include a display, an audio speaker, a haptic feedback mechanism, a Personal Area Network (PAN) transceiver etc. In the illustrated aspects, the output mechanism 744 may include a display operable to present media content that is in image or video format or an audio speaker to present media content that is in an audio format.

Figure 8:
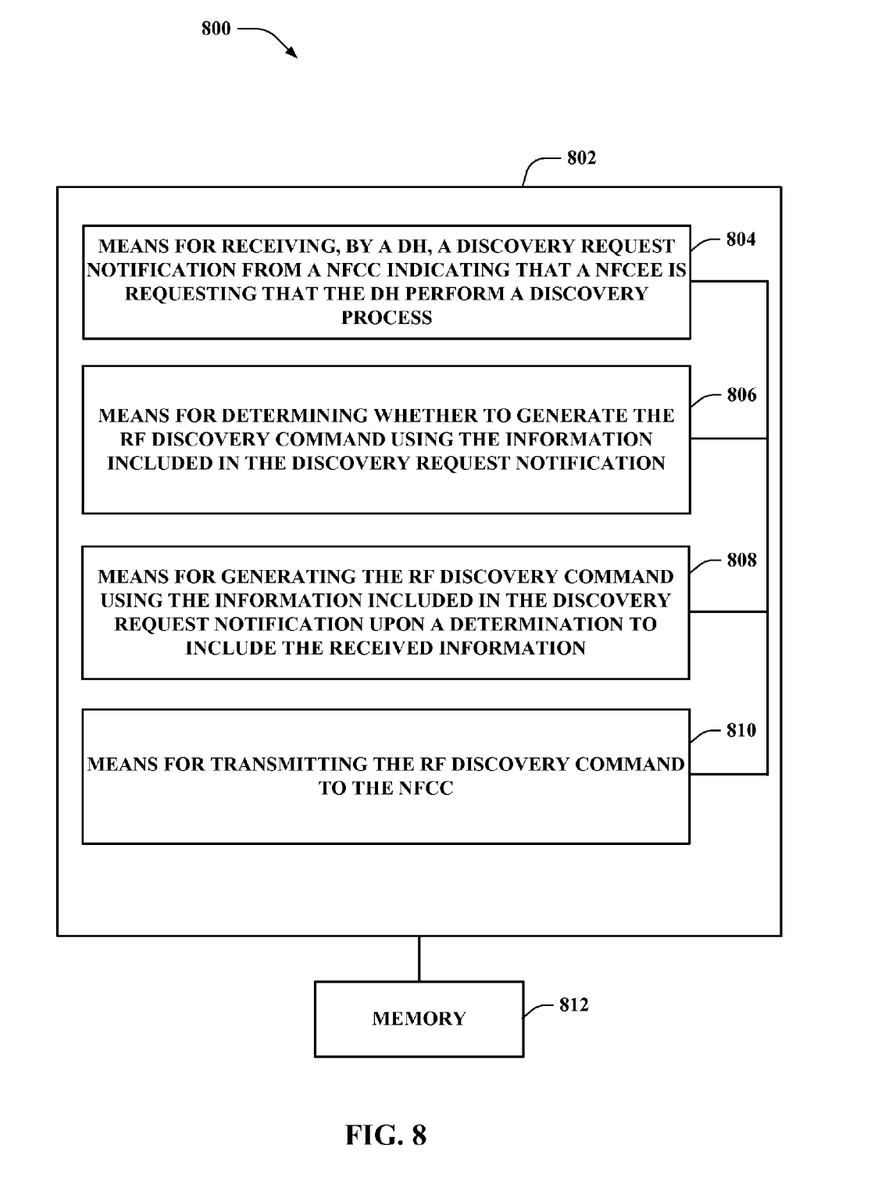
FIG. 8 is a functional block diagram of an example communication system for improving a NFCC discovery process originating from an NFCEE, according to an aspect.

FIG. 8 is a block diagram depicting an exemplary communication system 800 operable to provide a mechanism by which a NFCC device can provide a DH with sufficient information to begin RF Discovery on behalf of a NFCEE, according to an aspect. For example, system 800 can reside at least partially within a communications device (e.g., communications device 700). It is to be appreciated that system 800 is represented as including functional blocks, which can represent functions implemented by a processor, software, or combination thereof (e.g., firmware). System 800 includes a logical grouping 802 of electrical components that can act in conjunction.

For instance, logical grouping 802 can include an electrical component that may provide means for receiving, by a device host (DH), a discovery request notification from a near field communication controller (NFCC) indicating a near field communication execution environment (NFCEE) is requesting that the DH perform a discovery process 804. In an aspect, the discovery request notification may include information formatted to simplify the creation of a RF discovery command. In such an aspect, the information may include a RF technology and mode parameter. Further, the information may indicate to the DH any combination of a RF type, mode of operation, and active or passive communication type for use in the discovery process requested by the NFCEE. In an aspect, the discovery request notification may include a RF_NFCEE_DISCOVERY_REQ_NTF message. In another aspect, the NFCEE may be a secure element directly coupled to the NFCC. In an aspect, the NFCEE may be a universal integrated communication card (UICC) including a subscriber information module (SIM), a CDMA Subscriber Identity Module (CSIM), etc. In an aspect, logical component 804 may provide means for receiving a discovery response from the NFCC indicating successful reception of the RF discovery command.

Further, logical grouping 802 can include an electrical component that may provide means for determining whether to generate the RF discovery command using the information included in the discovery request notification 806.

Further, logical grouping 802 can include an electrical component that may provide means for generating the DH based discover command using the information included in the discovery request notification upon a determination to include the received information 808. In another aspect, the electrical component 808 may provide means for generating the RF discovery command with a parameter indicating the request is DH originated based upon a determination not to include the received information.

Moreover, logical grouping 802 can include an electrical component that may provide means for transmitting the RF discovery command to the NFCC 810. In an aspect, the RF discovery command may include a RF_DISCOVER_CMD message.

Additionally, system 800 can include a memory 812 that retains instructions for executing functions associated with the electrical components 804, 806, 808, and 810, stores data used or obtained by the electrical components 804, 806, 808, 810, etc. While shown as being external to memory 812, it is to be understood that one or more of the electrical components 804, 806, 808, and 810 may exist within memory 812. In one example, electrical components 804, 806, 808, and 810 can include at least one processor, or each electrical component 804, 806, 808, and 810 can be a corresponding module of at least one processor. Moreover, in an additional or alternative example, electrical components 804, 806, 808, and 810 may be a computer program product including a computer readable medium, where each electrical component 804, 806, 808, and 810 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communication, comprising:
   receiving, by a device host (DH) of a near field communication (NFC) device, a discovery request notification from a near field communication controller (NFCC) of the NFC device indicating that a near field communication execution environment (NFCEE) is requesting that the DH perform, via the NFCC, a discovery process, the discovery request notification including information formatted to simplify creation of a radio frequency (RF) discovery command by the DH;
   determining whether to generate the RF discovery command using the information included in the discovery request notification;
   generating, by the DH, the RF discovery command using the information included in the discovery request notification upon a determination to include the received information; and
   transmitting the RF discovery command from the DH to the NFCC,
   wherein the information comprises an RF technology and a mode parameter.

2. The method of claim 1, further comprising:
   generating the RF discovery command with a parameter indicating that the RF discovery command originated at the DH based upon a determination not to include the received information.

3. The method of claim 1, wherein the information indicates to the DH a RF type, mode of operation, and active or passive communication type for use in the discovery process requested by the NFCEE.

4. The method of claim 1, wherein the discovery request notification comprises a RF_NFCEE_DISCOVERY_REQ_NTF message.

5. The method of claim 1, wherein the RF discovery command comprises a RF_DISCOVER_CMD message.

6. The method of claim 1, wherein the NFCEE comprises a secure element directly coupled to the NFCC.

7. The method of claim 1, wherein the NFCEE comprises a universal integrated communication card (UICC) including at least one of a subscriber information module (SIM) or a CDMA Subscriber Identity Module (CSIM).

8. The method of claim 1, further comprising:
   receiving a discovery response from the NFCC indicating successful reception of the RF discovery command.

9. The method of claim 1, further comprising activating an interface with a remote NFC endpoint, starting an RF discovery process.

10. A non-transitory computer-readable medium comprising code for:
    receiving, by a device host (DH) of a near field communication (NFC) device, a discovery request notification from a near field communication controller (NFCC) of the NFC device indicating that a near field communication execution environment (NFCEE) is requesting that the DH perform, via the NFCC, a discovery process, the discovery request notification including information formatted to simplify creation of a radio frequency (RF) discovery command by the DH;
    determining whether to generate the RF discovery command using the information included in the discovery request notification;
    generating, by the DH, the RF discovery command using the information included in the discovery request notification upon a determination to include the received information; and transmitting the RF discovery command from the DH to the NFCC,
wherein the information comprises an RF technology and a mode parameter.

11. The computer-readable medium of claim 10, wherein the computer-readable medium further comprises code for:
generating the RF discovery command with a parameter indicating that the RF discovery command originated at the DH based upon a determination not to include the received information.

12. The computer-readable medium of claim 10, wherein the information indicates to the DH a RF type, mode of operation, and active or passive communication type for use in the discovery process requested by the NFCEE.

13. The computer-readable medium of claim 10, wherein the discovery request notification comprises a RF_NFCEE_DISCOVERY_REQ_NTF message.

14. The computer-readable medium of claim 10, wherein the RF discovery command comprises a RF_DISCOVER_CMD message.

15. The computer-readable medium of claim 10, wherein the NFCEE comprises a secure element directly coupled to the NFCC.

16. The computer-readable medium of claim 10, wherein the NFCEE comprises a universal integrated communication card (UICC) including at least one of a subscriber information module (SIM) or a CDMA Subscriber Identity Module (CSIM).

17. The computer-readable medium of claim 10, wherein the computer-readable medium further comprises code for:
receiving a discovery response from the NFCC indicating successful reception of the RF discovery command.

18. The computer-readable medium of claim 10, wherein an interface with a remote NFC endpoint is activated, starting an RF discovery process.

19. An apparatus for communication, comprising:
means for receiving, by a device host (DH) of the apparatus, a discovery request notification from a near field communication controller (NFCC) of the apparatus indicating that a near field communication execution environment (NFCEE) is requesting that the DH perform, via the NFCC, a discovery process, the discovery request notification including information formatted to simplify creation of a radio frequency (RF) discovery command by the DH;
means for determining whether to generate the RF discovery command using the information included in the discovery request notification;
means for generating, by the DH, the RF discovery command using the information included in the discovery request notification upon a determination to include the received information; and
means for transmitting the RF discovery command from the DH to the NFCC,
wherein the information comprises an RF technology and a mode parameter.

20. The apparatus of claim 19, wherein the means for generating further comprise:
means for generating the RF discovery command with a parameter indicating that the RF discovery command originated at the DH based upon a determination not to include the received information.

21. The apparatus of claim 19, wherein the information indicates to the DH a RF type, mode of operation, and active or passive communication type for use in the discovery process requested by the NFCEE.

22. The apparatus of claim 19, wherein the discovery request notification comprises a RF_NFCEE_DISCOVERY_REQ_NTF message.

23. The apparatus of claim 19, wherein the RF discovery command comprises a RF_DISCOVER_CMD message.

24. The apparatus of claim 19, wherein the NFCEE comprises a secure element directly coupled to the NFCC.

25. The apparatus of claim 19, wherein the NFCEE comprises a universal integrated communication card (UICC) including at least one of a subscriber information module (SIM) or a CDMA Subscriber Identity Module (CSIM).

26. The apparatus of claim 19, wherein the means for receiving further comprises:
means for receiving a discovery response from the NFCC indicating successful reception of the RF discovery command.

27. The apparatus of claim 19 wherein an interface with a remote NFC endpoint is activated, starting an RF discovery process.

28. An apparatus for communication, comprising:
a near field communication controller (NFCC);
a near field communication execution environment (NFCEE) coupled with the NFCC; and
a device host (DH) configured to:
receive a discovery request notification from the NFCC indicating that the NFCEE is requesting that the DH perform, via the NFCC, a discovery process, the discovery request notification including information formatted to simplify creation of a radio frequency (RF) discovery command by the DH;
determine whether to generate the RF discovery command using the information included in the discovery request notification;
generate the RF discovery command using the information included in the discovery request notification upon a determination to include the received information; and
transmit the RF discovery command to the NFCC,
wherein the information comprises an RF technology and a mode parameter.

29. The apparatus of claim 28, wherein the DH is further configured to:
generate the RF discovery command with a parameter indicating that the RF discovery command originated at the DH based upon a determination not to include the received information.

30. The apparatus of claim 28, wherein the information indicates to the DH a RF type, mode of operation, and active or passive communication type for use in the discovery process requested by the NFCEE.

31. The apparatus of claim 28, wherein the discovery request notification comprises a RF_NFCEE_DISCOVERY_REQ_NTF message.

32. The apparatus of claim 28, wherein the RF discovery command comprises a RF_DISCOVER_CMD message.

33. The apparatus of claim 28, wherein the NFCEE comprises a secure element directly coupled to the NFCC.

34. The apparatus of claim 28, wherein the NFCEE comprises a universal integrated communication card (UICC) including at least one of a subscriber information module (SIM) or a CDMA Subscriber Identity Module (CSIM).

35. The apparatus of claim 28, wherein the DH is further configured to:
receive a discovery response from the NFCC indicating successful reception of the RF discovery command.

36. The apparatus of claim 28, wherein an interface with a remote NFC endpoint is activated, starting an RF discovery process.

\* \* \* \* \*